United States Patent
Park et al.

(10) Patent No.: US 12,303,729 B2
(45) Date of Patent: May 20, 2025

(54) FIRE DETECTION SYSTEM

(71) Applicant: AlcheraX, Inc., Sunnyvale, CA (US)

(72) Inventors: Jongsong Park, Seongnam-si (KR); Ja-Yeon Jeong, Seongnam-si (KR); Young Kyoo Hwang, Suwon-si (KR); Jiheon Park, Suwon-si (KR); Hotaek Han, Siheung-si (KR); Jai Hoon Park, Yongin-si (KR); Jung-Bae Kim, Seoul (KR)

(73) Assignee: ALCHERAX, INC., Sunnyvale, CA (US)

( * ) Notice: Subject to any disclaimer, the term of this patent is extended or adjusted under 35 U.S.C. 154(b) by 344 days.

(21) Appl. No.: 17/768,554

(22) PCT Filed: Jan. 29, 2020

(86) PCT No.: PCT/KR2020/001357
§ 371 (c)(1),
(2) Date: Apr. 13, 2022

(87) PCT Pub. No.: WO2021/091021
PCT Pub. Date: May 14, 2021

(65) Prior Publication Data
US 2023/0201642 A1    Jun. 29, 2023

(30) Foreign Application Priority Data
Nov. 8, 2019 (KR) .......................... 10-2019-0142797

(51) Int. Cl.
  *A62C 3/02*     (2006.01)
  *G06T 5/70*     (2024.01)
  (Continued)

(52) U.S. Cl.
  CPC .............. *A62C 3/0271* (2013.01); *G06T 5/70* (2024.01); *G06T 5/73* (2024.01); *G06T 7/215* (2017.01);
  (Continued)

(58) Field of Classification Search
  CPC ........... A62C 3/0271; G06T 5/70; G06T 5/73; G06T 7/215; G06T 7/246;
  (Continued)

(56) References Cited

U.S. PATENT DOCUMENTS

| | | | |
|---|---|---|---|
| 7,680,297 B2 | 3/2010 | Privalov | |
| 7,786,877 B2 | 8/2010 | Hou | |
| 9,390,604 B2 | 7/2016 | Dortch et al. | |

FOREIGN PATENT DOCUMENTS

| | | |
|---|---|---|
| JP | 2019-179573 | 10/2019 |
| KR | 10-1538923 | 7/2015 |

(Continued)

OTHER PUBLICATIONS

KIPO, PCT Search Report & Written Opinion of PCT/KR2020/001357 dated Aug. 5, 2020.

*Primary Examiner* — Nizar N Sivji
(74) *Attorney, Agent, or Firm* — LEX IP MEISTER, PLLC

(57) ABSTRACT

Disclosed is a fire detecting system. The fire detecting system includes: an optical flow detecting module for estimating a motion of a fire element from an input image, and determining a first candidate area in the input image; an image feature detecting module for recognizing an image feature of the fire element from the input image, and determining a second candidate area in the input image; a candidate area analyzing module for determining a suspicion area in which a generation of fire is suspected in the input image based on the first candidate area and the second (Continued)

candidate area; an ignition point estimating module for estimating a position of an ignition point in the suspicion area; a fire classifying module for calculating classifying scores obtained by predicting whether a fire is generated in the suspicion area; and a temporal analysis module for determining whether a fire is generated based on the position of the ignition point and the classifying scores.

7 Claims, 16 Drawing Sheets

(51) Int. Cl.
*G06T 5/73* (2024.01)
*G06T 7/215* (2017.01)
*G06T 7/246* (2017.01)
*G06V 10/62* (2022.01)
*G06V 10/764* (2022.01)
*G06V 10/774* (2022.01)
*G06V 20/10* (2022.01)

(52) U.S. Cl.
CPC ............... *G06T 7/246* (2017.01); *G06V 10/62* (2022.01); *G06V 10/764* (2022.01); *G06V 10/774* (2022.01); *G06V 20/188* (2022.01)

(58) Field of Classification Search
CPC .......... G06T 2207/20084; G06T 2207/20081; G06V 10/62; G06V 10/764; G06V 10/774; G06V 20/188; G06V 10/82; G06V 10/25; G06V 20/52; G08B 29/186; G08B 17/005; G08B 17/125; G08B 17/10; G06N 3/08; G06F 18/24
See application file for complete search history.

(56) References Cited

FOREIGN PATENT DOCUMENTS

| | | |
|---|---|---|
| KR | 10-1822924 | 1/2018 |
| KR | 101822924 B1 * | 1/2018 |
| KR | 10-2018-0107930 | 10/2018 |
| KR | 10-1932543 | 12/2018 |
| KR | 10-1934700 | 1/2019 |
| KR | 101934700 B1 * | 1/2019 |

* cited by examiner

FIRE DETECTION SYSTEM

TECHNICAL FIELD

The present invention relates to a fire detecting system.

BACKGROUND ART

As computer hardware develops and interest on big data increases, AI skills including deep learning are highlighted. The recurrent neural network (RNN), the convolutional neural network (CNN), and the deep belief network (DBN) are representative of neural networks used in the deep learning. The various deep learning schemes are applied to the fields of computer vision, voice recognition, natural language processes, and voice and signal processes and show high-level results.

When a fire is generated, and the fire is detected in an initial stage and is quickly processed, loss of lives, property damages, and environmental damage caused by the accidents of fire may be reduced. Therefore, methods for quickly detecting the fire in an earlier stage and increasing the accuracy of detection are researched by using the latest skills such as the deep learning scheme.

The above information disclosed in this Background section is only for enhancement of understanding of the background of the invention, and therefore it may contain information that does not form the prior art that is already known in this country to a person of ordinary skill in the art.

DISCLOSURE

The present invention has been made in an effort to provide a fire detecting system for quickly and accurately detecting an initial fire by using deep learning.

An embodiment of the present invention provides a fire detecting system including: an optical flow detecting module for estimating a motion of a fire element from an input image, and determining a first candidate area in the input image; an image feature detecting module for recognizing an image feature of the fire element from the input image, and determining a second candidate area in the input image; a candidate area analyzing module for determining a suspicion area in which a generation of fire is suspected in the input image based on the first candidate area and the second candidate area; an ignition point estimating module for estimating a position of an ignition point in the suspicion area; a fire classifying module for calculating classifying scores obtained by predicting whether a fire is generated in the suspicion area; and a temporal analysis module for determining whether a fire is generated based on the position of the ignition point and the classifying scores.

The input image may include a plurality of frames, and the optical flow detecting module may determine the first candidate area by using a deep learning model studied with optical flow training data among a plurality of frames generated by a computer graphic process.

The image feature detecting module may determine the second candidate area by using a deep learning model studied with generated fire training data corresponding to the fire element.

The fire detecting system may further include a candidate area tracking module for tracking the first candidate area and the second candidate area and providing tracking results to the candidate area analyzing module.

The candidate area analyzing module may output suspicion area information including at least one of an optical flow vector and an optical flow size showing an optical flow approximating a position of the suspicion area, a size of the suspicion area, and a motion of the fire element in the input image, a soft mask indicating flame predicted from the input image, and a soft mask indicating predicted smoke in the input image.

The ignition point estimating module may estimate the position of the ignition point by using a deep learning model studied with synthetic training data that are a synthesis of the fire element and backgrounds by a computer graphic process.

The fire classifying module may score whether a fire is generated in the suspicion area by using the deep learning classifying model, or may calculate the classifying scores having scored the probability in which the fire element of the suspicion area is classified into flame or smoke.

The input image may include a plurality of frames, and the temporal classifying module may determine whether the fire is generated by considering temporal coherence on the frames.

The fire detecting system further includes a stabilizing module for providing a shaking corrected image obtained by correcting shaking of the input image to the optical flow detecting module and the image feature detecting module.

The stabilizing module may include a motion vector extracting module for extracting a motion vector from the input image, and a temporal smoothing module for performing a temporal smoothing process on the input image by using the motion vector.

Another embodiment of the present invention provides a fire detecting system including: a motion vector extracting module for extracting a motion vector from an input image; a temporal smoothing module for performing a temporal smoothing process on the input image by using the motion vector, and outputting a shaking corrected image on the input image; a suspicion area detecting module for determining a suspicion area in which a generation of fire is suspected from at least one of the input image and the shaking corrected image; an ignition point estimating module for estimating a position of an ignition point in the suspicion area; a fire classifying module for calculating and classifying scores predicting whether a fire is generated in the suspicion area; and a temporal analysis module for determining whether a fire is generated based on the position of the ignition point and the classifying score.

The suspicion area detecting module may include an optical flow detecting module for estimating a motion of a fire element from the shaking corrected image, and determining a first candidate area in the input image; an image feature detecting module for recognizing an image feature of the fire element from the input image, and determining a second candidate area in the input image; and a candidate area analyzing module for determining a suspicion area in which a generation of fire is suspected in the input image based on the first candidate area and the second candidate area.

The ignition point estimating module may estimate the position of the ignition point by using a deep learning model studied with synthetic training data that are a synthesis of the fire element and backgrounds by a computer graphics process.

The fire classifying module may score whether a fire is generated in the suspicion area by using the deep learning classifying model, or may calculate the classifying scores having scored the probability in which the fire element of the suspicion area is classified into flame or smoke.

The input image may include a plurality of frames, and the temporal classifying module may determine whether the fire is generated by considering temporal coherence of the frames.

Another embodiment of the present invention provides a fire detecting system including: a motion vector extracting module for extracting a motion vector from an input image; a temporal smoothing module for performing a temporal smoothing process on the input image by using the motion vector, and outputting a shaking corrected image on the input image; an optical flow detecting module for estimating a motion of a fire element from the shaking corrected image, and determining a first candidate area in the input image; an image feature detecting module for recognizing an image feature of the fire element from the input image, and determining a second candidate area in the input image; and a candidate area analyzing module for determining a suspicion area in which a generation of fire is suspected in the input image based on the first candidate area and the second candidate area.

The fire detecting system may further include: an ignition point estimating module for estimating a position of an ignition point in the suspicion area; a fire classifying module for calculating classifying score predicting whether a fire is generated in the suspicion area; and a temporal analysis module for determining whether a fire is generated based on the position of the ignition point and the classifying score.

The input image may include a plurality of frames, and the optical flow detecting module may determine the first candidate area by using a deep learning model studied with optical flow training data among the frames generated by a computer graphics process.

The image feature detecting module may determine the second candidate area by using a deep learning model studied with generated fire training data corresponding to the fire element.

The fire detecting system may further include a candidate area tracking module for tracking the first candidate area and the second candidate area, and providing tracking results to the candidate area analyzing module.

According to an embodiment of the present invention, when external forces such as rain and wind are applied to a camera installed outside, the fire detecting system corrects the shaking of the photographed image, thereby increasing the fire detecting accuracy. The fire detection may be performed with high accuracy by analyzing the photographed image with a single modality such as a color (RGB) image or a near infrared (NIR) image According to an embodiment of the present invention, the fire detecting system 10 may increase the accuracy of detecting the candidate areas with high probabilities of generation of fire by using the deep learning scheme, and estimating the motion of the fire element such as flame and smoke and simultaneously recognizing the image feature (e.g., color, texture, form, brightness, etc.) of the fire element.

According to an embodiment of the present invention, the accuracy of determining whether a fire is generated may be increased by using the ignition point estimating module 162 as a main engine and the fire classifying module 164 as an auxiliary engine to the suspicion area. The accuracy of determining whether a fire is generated may be further increased by determining whether a fire is generated by considering the temporal coherence of a plurality of frames.

MODE FOR INVENTION

Figure 1:
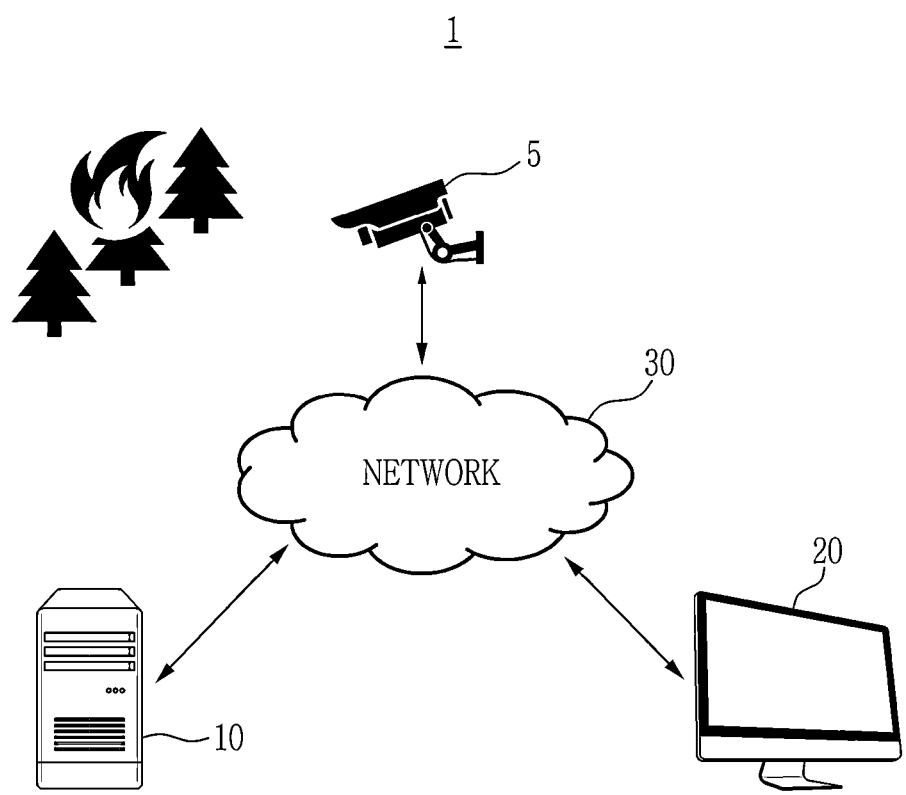
FIG. 1 shows a schematic view of a fire detecting and monitoring system according to an embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive, and like reference numerals designate like elements throughout the specification.

Unless explicitly described to the contrary, the word "comprise" and variations such as "comprises" or "comprising" will be understood to imply the inclusion of stated elements but not the exclusion of any other elements. The terms "-er", "-or", and "module" described in the specification mean units for processing at least one function and operation, and can be implemented by hardware components or software components and combinations thereof.

FIG. 1 shows a schematic view of a fire detecting and monitoring system according to an embodiment of the present invention.

Referring to FIG. 1, the fire detecting and monitoring system 1 may include a camera 5, a fire detecting system 10, and a monitoring device 20. The camera 5, the fire detecting system 10, and the monitoring device 20 may transmit and receive data to/from each other through a network 30.

The camera 5 is an optical device installed at a specific point and photographs a predesignated place. For example, the camera 5 may be installed outside a building to photograph an exterior of the building, may be installed inside the building to photograph an interior of the building, or may be installed on the outside to photograph a predesignated place outside. In some embodiments of the present invention, the camera 5 may be installed outside to photograph a place where a fire (e.g., a forest fire) may occur.

The camera 5 may provide a photographed image obtained by photographing the predesignated place to the fire detecting system 10. In some embodiments of the present invention, the camera 5 may provide the photographed image with a single modality to the fire detecting system 10. Here, the photographed image with a single modality may be, for example, a color (RGB) image and a near infrared (NIR) image, and a range of the present invention is not limited thereto.

The fire detecting system 10 uses the photographed image provided by the camera 5 to generate fire information on the predesignated place, and provides the fire information to the monitoring device 20. The fire information may include various kinds of information such as whether a fire broke out in a predesignated place, a position of an ignition point, an optical flow vector and an optical flow size of fire elements (e.g., flame, smoke, etc.,), and a form and a shape of the fire elements. A detailed content of the fire detecting system 10 will be described in a later part of the present specification with reference to FIG. 2 to FIG. 13.

Particularly, the fire detecting system 10 according to embodiments of the present invention may perform a fire analysis on the predesignated place and may generate the above-noted fire information by using a deep learning scheme. The fire detecting system 10 may be realized by a super computer, a server, a main frame, a workstation, a personal computer, a laptop computer, a tablet computer, a built-in computer, and a wearable computer, and a range of the present invention is not limited thereto, and the fire detecting system 10 may be realized by an arbitrary computing device for performing a fire analysis algorithm by using a deep learning scheme.

The monitoring device 20 receives fire information on a predesignated place from the fire detecting system 10, provides corresponding fire information to a user or fire monitoring software, and monitors whether a fire is generated at a predesignated place. In a like way of the fire detecting system 10, the monitoring device 20 may also be realized by an arbitrary computing device for providing corresponding fire information to the user or the fire monitoring software and monitoring whether a fire is generated at a predesignated place.

The network 30 may include a cable network such as a local area network (LAN) or a wide area network (WAN), a wireless network such as a wireless local area network (WLAN) or a cellular network, and a cable and wireless network that is a combination of the cable network and the wireless network, and the range of the present invention is not limited thereto, and the network 30 may include direct connection between devices. For example, at least two of the camera 5, the fire detecting system 10, and the monitoring device 20 may transmit and receive data to/from each other by a direct connected through a cable.

Figure 2:
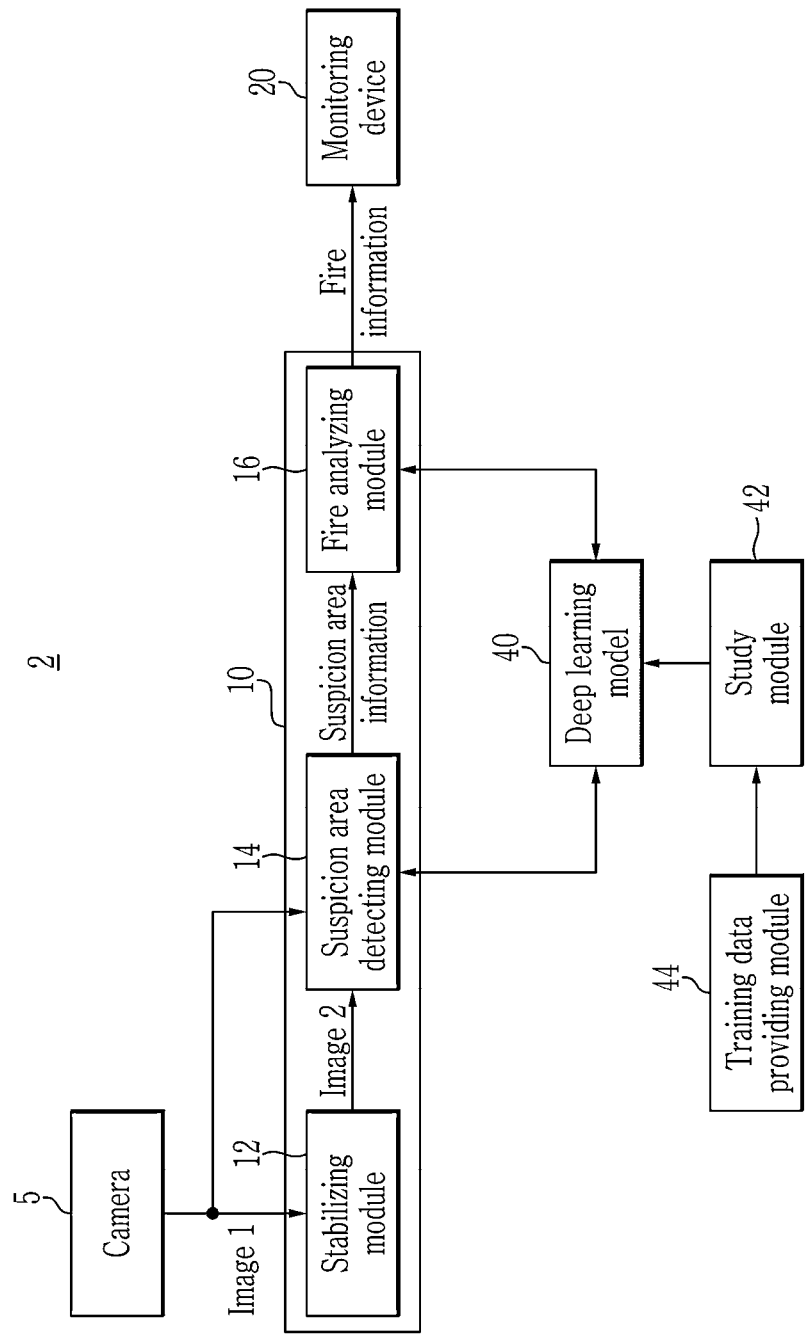
FIG. 2 shows a block diagram of a fire detecting and monitoring system according to an embodiment of the present invention.

FIG. 2 shows a block diagram of a fire detecting and monitoring system according to an embodiment of the present invention.

Referring to FIG. 2, the fire detecting and monitoring system 2 may include a camera 5, a fire detecting system 10, a monitoring device 20, a deep learning model 40, a study module 42, and a training data providing module 44. Descriptions on the camera 5 and the monitoring device 20 may refer to what is described with reference to FIG. 1, and no repeated description will be provided.

The fire detecting system 10 may include a stabilizing module 12, a suspicion area detecting module 14, and a fire analyzing module 16.

The stabilizing module 12 may correct shaking of a photographed image provided by the camera 5. In detail, the stabilizing module 12 may receive a first image (corresponding to a photographed image) from the camera 5, may perform a shaking correcting task on the first image, and may output a second image (corresponding to a shaking corrected image). The stabilizing module 12 may provide the second image as an input image on the suspicion area detecting module 14. A detailed content of the stabilizing module 12 will be described in a later part of the present specification with reference to FIG. 3 to FIG. 5.

The suspicion area detecting module 14 may determine a suspicion area in which generation of fire is suspected from at least one of the photographed image provided by the camera 5 and the shaking corrected image provided by the stabilizing module 12. In detail, the suspicion area detecting module 14 estimates a motion of the fire elements and simultaneously recognizes the image feature (e.g., color, texture, form, brightness, etc.,) of the fire elements from at least one of the first image provided by the camera 5 and the second image provided by the stabilizing module 12 as an input image by using the deep learning scheme to thus determine a suspicion area where generation of fire is suspected from the input image. Here, the image feature of the fire elements may be, for example, colors, textures, forms, and brightness of the fire elements, and it may include patterns of the image feature, for example, a display pattern, a motion pattern, and a change pattern. A detailed content of the suspicion area detecting module 14 will be described in a later part of the present specification with reference to FIG. 6 to FIG. 9.

The fire analyzing module 16 may determine whether a fire broke out by analyzing the suspicion area determined by the suspicion area detecting module 14. In detail, the fire analyzing module 16 may analyze and determine whether a fire broke out in the corresponding suspicion area based on suspicion area information provided by the suspicion area detecting module 14 by using the deep learning scheme. A detailed content of the fire analyzing module 16 will be described in a later part of the present specification with reference to FIG. 10 to FIG. 13.

In addition, the deep learning model 40, the study module 42, and the training data providing module 44 may be realized to be included in the fire detecting system 10, and differing from this, they may be realized as another computing device that is different from the fire detecting system 10 depending on detailed realization objects, and the range of the present invention is not limited thereto. A detailed content thereof will be described in a later part of the present specification in connection with the suspicion area detecting module 14 and the fire analyzing module 16.

Figure 3:
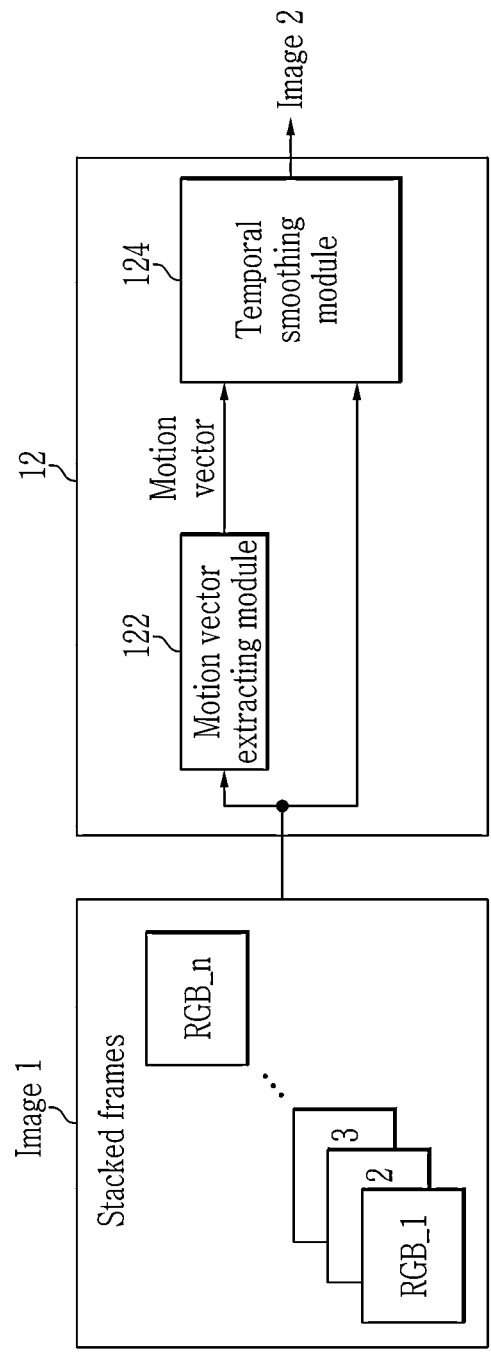
FIG. 3 shows a block diagram of a stabilizing module according to an embodiment of the present invention.

FIG. 3 shows a block diagram of a stabilizing module according to an embodiment of the present invention.

Referring to FIG. 3, the stabilizing module 12 may include a motion vector extracting module 122 and a temporal smoothing module 124.

The camera 5 may, for example, be installed in the outside so as to photograph the place where a forest fire may break out. To obtain a sufficient photographing view by the camera 5, it may be installed at a relatively high place from the ground. In this case, external forces such as rain or wind are applied to the camera 5 so the camera 5 may be shaken and shaken photographed results may be obtained.

When the shaken photographed results are obtained, the suspicion area detecting module 14 and the fire analyzing module 16 may reduce accuracy for detecting the fire elements. For example, the suspicion area detecting module 14 determines the suspicion area by using the motion of the fire element and the image feature from the input image, and when the input image includes shaking, it may be inaccurate to specify the fire element in the input image, so it may be needed to correct the shaking.

The motion vector extracting module 122 may extract a motion vector from the input image (i.e., the first image). The input image may include a plurality of frames, FIG. 3 exemplarily illustrates a plurality of RGB frames, and the range of the present invention is not limited thereto. The motion vector may represent a distance (or a displacement) by which a specific object moves between frames when a motion estimation is applied to the specific object.

The temporal smoothing module 124 may perform a temporal smoothing process on the input image by using the motion vector extracted from the motion vector extracting module 122. In detail, the temporal smoothing module 124 may, for example, perform a synthesis of a time difference estimating image for solving inconvenience for watching that is generated by a limited time difference in the input image acquired by using the camera 5, or may perform a temporal smoothing process for removing, for example, a flicker phenomenon that may be generated by a time difference estimating difference that may be generated for a time difference estimating process. In a like way, the temporal smoothing module 124 may generate a shaking corrected image (or the second image) obtained by correcting the shaking of the input image (i.e., the first image) by using the input image and the motion vector, and may provide it to the suspicion area detecting module 14 (e.g., the optical flow detecting module 142 and the image feature detecting module 144).

Therefore, when the external forces such as rain and wind are applied to the camera 5 installed outside, the fire detecting system corrects the shaking of the photographed image by using the stabilizing module 12, thereby increasing the fire detecting accuracy. The fire detection may be performed with high accuracy by analyzing the photographed image with a single modality such as the color (RGB) image or the near infrared (NIR) image In some embodiments of the present invention, what that is realized by using the motion vector extracting module 122 and the temporal smoothing module 124 is an example for realizing the stabilizing module 12, and a detailed content for realizing the stabilizing module 12 is variable in many ways from the present embodiment according to the detailed realization object. The stabilizing module 12 may perform the above-noted shaking correction by using software, hardware, or both of the software and the hardware.

Figure 4:
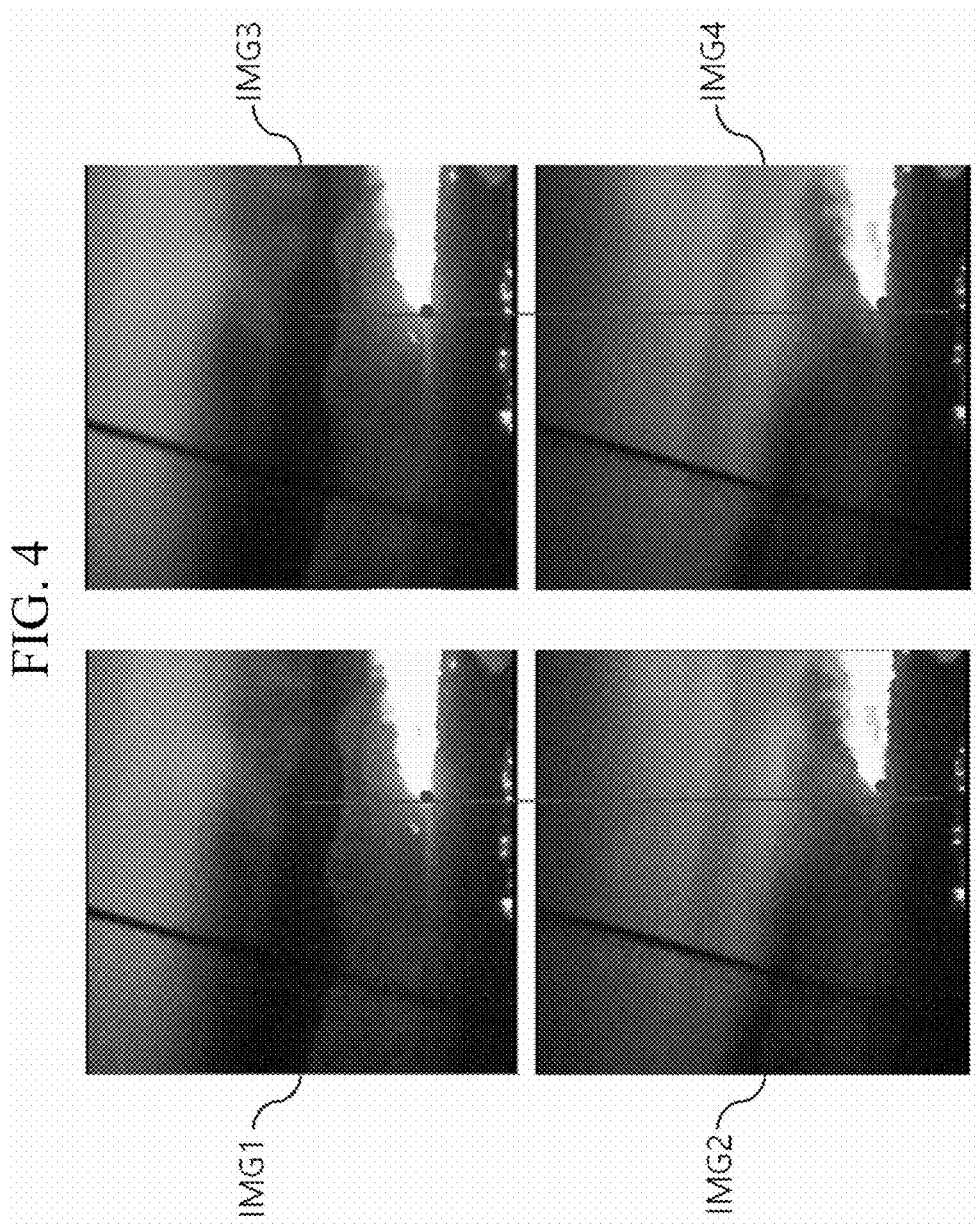
FIG. 4 and FIG. 5 show an operational example of a stabilizing module according to an embodiment of the present invention.
Figure 5:
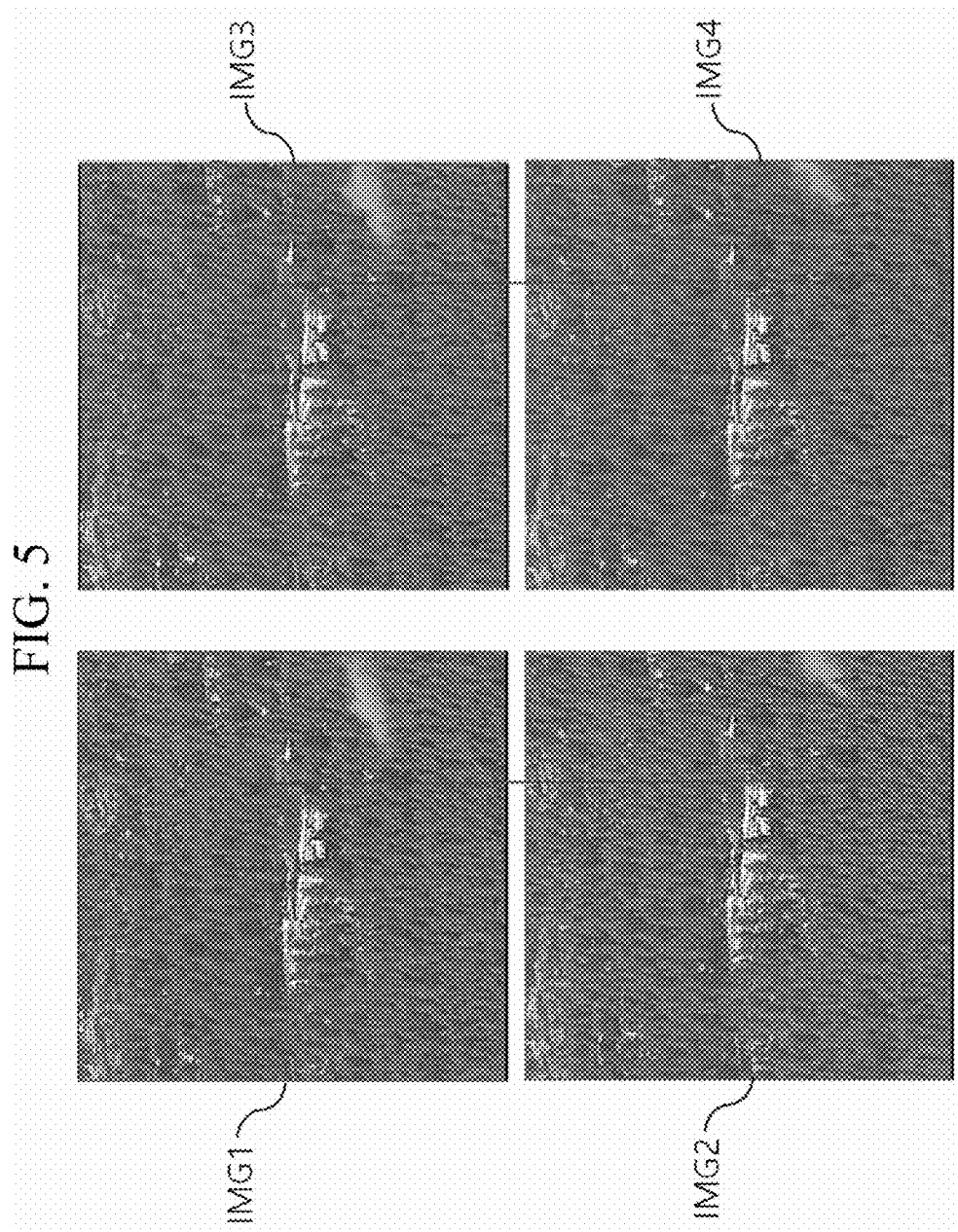

FIG. 4 and FIG. 5 show an operational example of a stabilizing module according to an embodiment of the present invention.

Referring to FIG. 4, the images IMG1 to the image IMG4 may, for example, correspond to the frames configuring the NIR image photographed by the camera 5.

The images IMG1 and IMG2 correspond to the frames before the stabilizing module 12 performs the shaking correction, and the image IMG2 may correspond to the next frame of the image IMG1 in a temporal order.

The images IMG3 and IMG4 correspond to the frames after the stabilizing module 12 performs the shaking correction, and the image IMG4 may correspond to the next frame of the image IMG3 in a temporal order.

When the images IMG1 and IMG2 are compared to the images IMG3 and IMG4, it is found that the image IMG2 before the stabilizing module 12 performs the shaking correction leans on the right from the image IMG1, and the leaning of the image IMG4 after the stabilizing module 12 performs the shaking correction is reduced with respect to the image IMG3.

Referring to FIG. 5, the image IMG1 to image IMG4 may, for example, correspond to the frames configuring the color (RGB) image photographed by the camera 5.

The images IMG1 and IMG2 correspond to the frames before the stabilizing module 12 performs the shaking correction, and the image IMG2 may correspond to the next frame of the image IMG1 in temporal order.

The images IMG3 and IMG4 correspond to the frame after the stabilizing module 12 performs the shaking correction, and the image IMG4 may correspond to the next frame of the image IMG3 in temporal order.

When the images IMG1 and IMG2 are compared to the images IMG3 and IMG4, it is found that the image IMG2 before the stabilizing module 12 performs the shaking correction leans on the right from the image IMG1, and the leaning of image IMG4 after the stabilizing module 12 performs the shaking correction is reduced with respect to the image IMG3.

Figure 6:
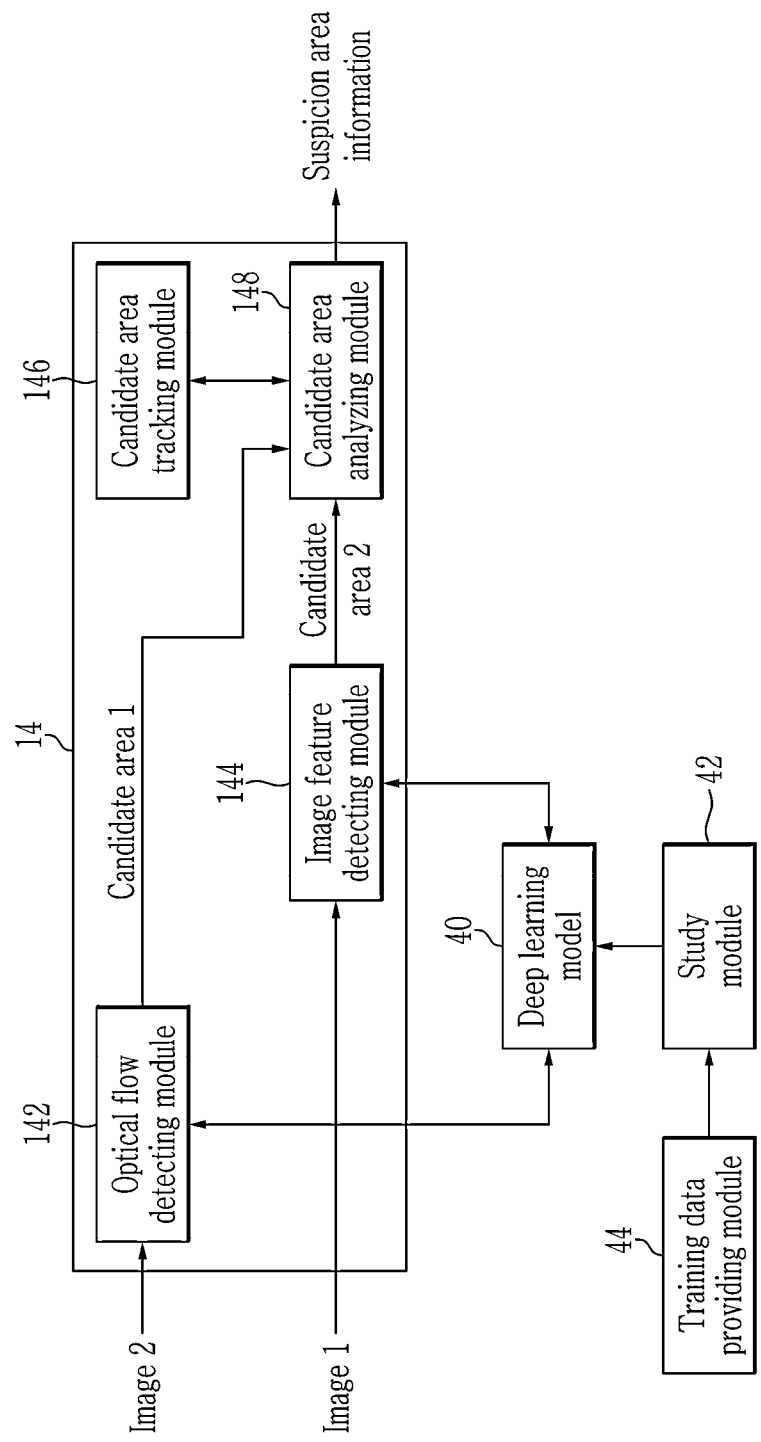
FIG. 6 shows a block diagram of a suspicion area detecting module according to an embodiment of the present invention.

FIG. 6 shows a block diagram of a suspicion area detecting module according to an embodiment of the present invention.

Referring to FIG. 6, the suspicion area detecting module 14 may include an optical flow detecting module 142, an image feature detecting module 144, a candidate area tracking module 146, and a candidate area analyzing module 148.

The optical flow detecting module 142 may estimate a motion of the fire element from the input image, and may determine a first candidate area from the input image. In detail, the input image may include a plurality of frames, and the optical flow detecting module 142 may determine the first candidate area by using a deep learning model studied with optical flow training data among a plurality of frames generated by a computer graphics process.

When a fire breaks out, the fire elements such as flame and smoke are generally spread with respect to time. The optical flow detecting module 142 may approximate the motion for the fire element to be spread with respect to time as an optical flow in the frames sequentially generated in temporal order, for example, two continuous frames.

For example, the training data providing module 44 may provide the optical flow training data among a plurality of frames generated with a computer graphics process, that is, data on the motion of the fire element with respect to time to the study module 42, and the study module 42 may make the deep learning model 40 study by using training data provided by the training data providing module 44. The optical flow detecting module 142 may input the input image to the trained deep learning model 40, and the deep learning model 40 may estimate the motion of the fire element and may predict the first candidate area.

The image feature detecting module 144 may recognize the image feature of the fire element from the input image, and may determine a second candidate area from the input image. In detail, the image feature detecting module 144 may determine the second candidate area by using the deep learning model studied with the fire training data generated corresponding to the fire element.

When a fire breaks out, the fire elements such as flame and smoke may have the image feature distinguished from other elements that are not the fire elements in the color, texture, form, and brightness. The image feature detecting module 144 may determine the second candidate area including the fire element by recognizing the feature shown in the input image.

For example, the training data providing module 44 provides generated fire training data corresponding to the fire element, that is, the training data on the image feature of the fire element to the study module 42, and the study module 42 may make the deep learning model 40 study by using the training data provided by the training data providing module 44. The image feature detecting module 144 may input the input image to the trained deep learning model 40, and the deep learning model 40 may recognize the image feature of the fire element and may predict the second candidate area.

In the present embodiment, the optical flow detecting module 142 may be realized to receive a second image corresponding to the shaking corrected image, and the image feature detecting module 144 may be realized to receive a first image corresponding to the input image. In detail, the optical flow detecting module 142 must detect and estimate the motion of particularly the fire element (e.g., smoke movement) so it may generate better performance to receive the second image provided by the stabilizing module 12. The image feature detecting module 144 searches for the candidate area according to the image feature (e.g., the pattern of the fire element such as smoke or flame) indicated on the input image, and the image feature may be diluted by a temporal smoothing process performed by the stabilizing module 12, so it may generate better performance to receive the first image to which the shaking correction is not performed.

However, the present invention is not limited thereto. The above-described performance effect may be changed depending on the condition in which the fire detecting system according to the present invention is operated, and the optical flow detecting module 142 may be realized to receive the first image and the image feature detecting module 144 may be realized to receive the second image, or the optical flow detecting module 142 and the image feature detecting module 144 may be realized to receive the first image or receive the second image according to the detailed realization objects.

One of the optical flow detecting module 142 and the image feature detecting module 144 may be omitted according to the detailed realization objects. That is, in an embodiment described with reference to FIG. 6, the optical flow detecting module 142 may be omitted, and the image feature detecting module 144 may receive the first image or the second image to detect the candidate area and provide the same to the candidate area analyzing module 148, and on the contrary, the image feature detecting module 144 may be omitted, and the optical flow detecting module 142 may receive the first image or the second image to detect the candidate area and provide the same to the candidate area analyzing module 148.

The candidate area tracking module 146 may track the first candidate area and the second candidate area and may provide a tracking result to the candidate area analyzing module 148. In detail, the candidate area tracking module 146 may track the first candidate area and the second candidate area to increase processing rates of the optical flow detecting module 142 and the image feature detecting module 144 and increase accuracy.

Differing from what is shown in FIG. 6, the candidate area tracking module 146 may be omitted. In detail, the candidate area tracking module 146 may be tracked by the candidate area analyzing module 148 or another module, and if needed, the candidate area tracking module 146 may not be tracked.

The candidate area analyzing module 148 may determine the suspicion area in which a generation of fire is suspected in the input image based on the first candidate area and the second candidate area. In detail, the candidate area analyzing module 148 may, for example, output suspicion area information including at least one of an optical flow vector and an optical flow size showing an optical flow approximating a position of the suspicion area, a size of the suspicion area, and a motion of the fire element in the input image, a soft mask indicating flame predicted from the input image, and a soft mask indicating predicted smoke in the input image.

The suspicion area information is transmitted to the fire analyzing module 16 so that the fire analyzing module 16 may determine whether a fire is generated focusing on areas with high probabilities of generation of fire from among the photographed places.

According to the present embodiment, the fire detecting system 10 may increase the accuracy of detecting the candidate areas with high probabilities of generation of fire by using the deep learning scheme, and estimating the motion of the fire element such as flame and smoke and simultaneously recognizing the image feature (e.g., color, texture, form, brightness, etc.) of the fire element.

Figure 7:
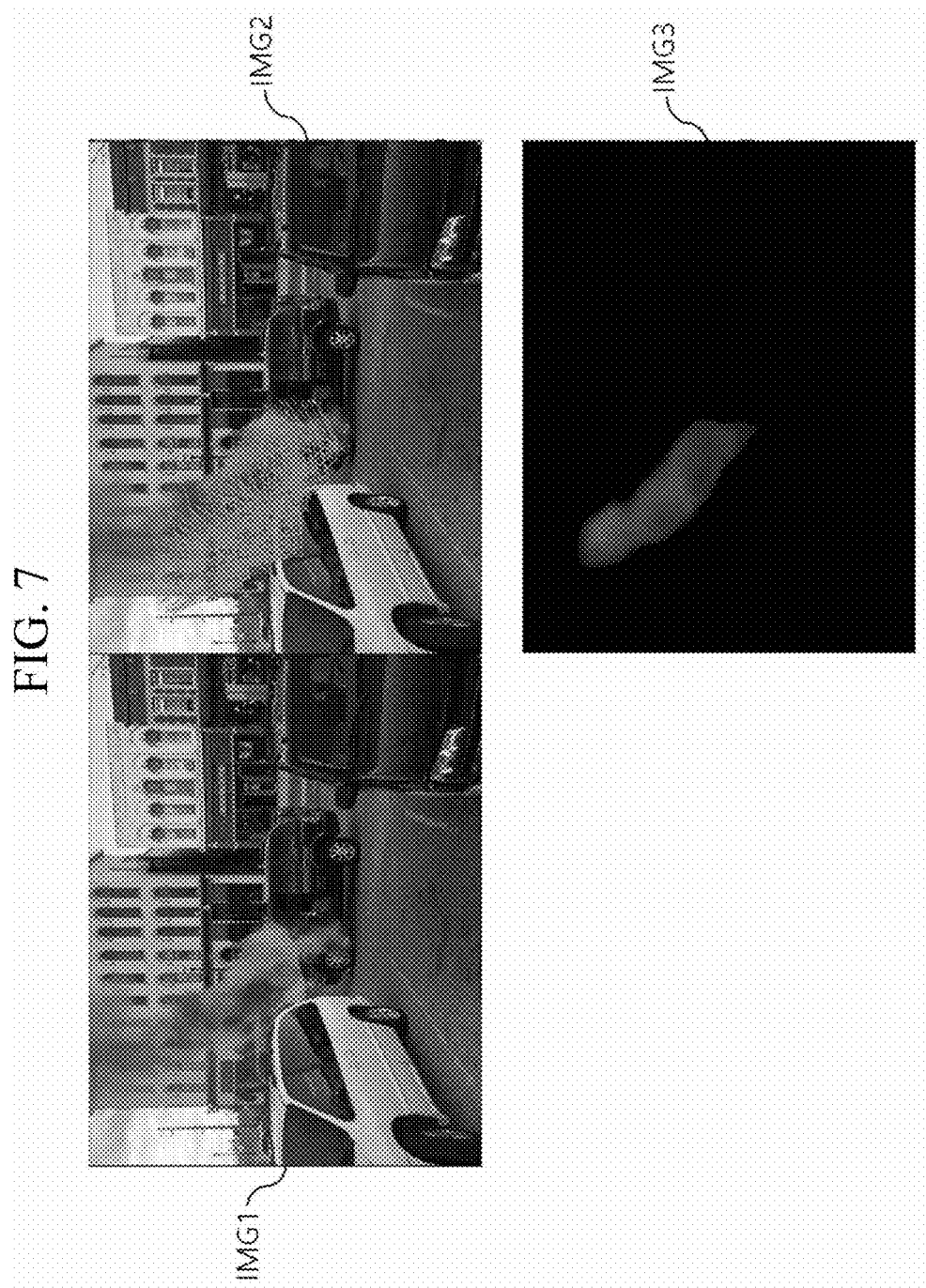
FIG. 7 shows an operational example of an optical flow detecting module according to an embodiment of the present invention.

FIG. 7 shows an operational example of an optical flow detecting module according to an embodiment of the present invention.

Referring to FIG. 7, the image IMG1 corresponds to an original version of the input image, and the image IMG2 shows the motion for the fire element to be spread with respect to time with optical flow vectors. The image IMG3 shows the motion for the fire element to be spread with respect to time with sizes of the optical flow vectors. That is, the optical flow detecting module 142 may, as shown, estimate the motion of the fire element (or smoke) from the input image (the image IMG1) and may approximate the same as the optical flow.

Figure 8:
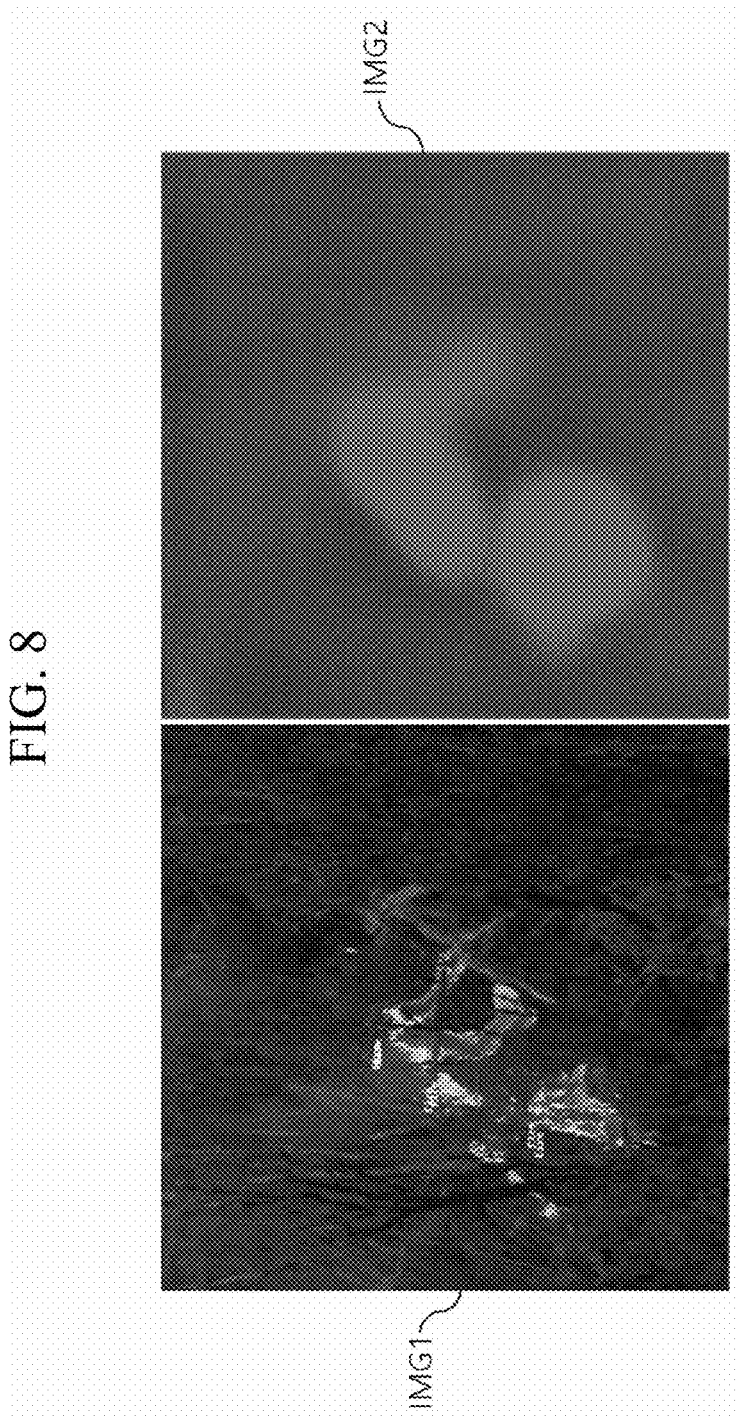
FIG. 8 and FIG. 9 show an operational example of an image feature detecting module according to an embodiment of the present invention.
Figure 9:
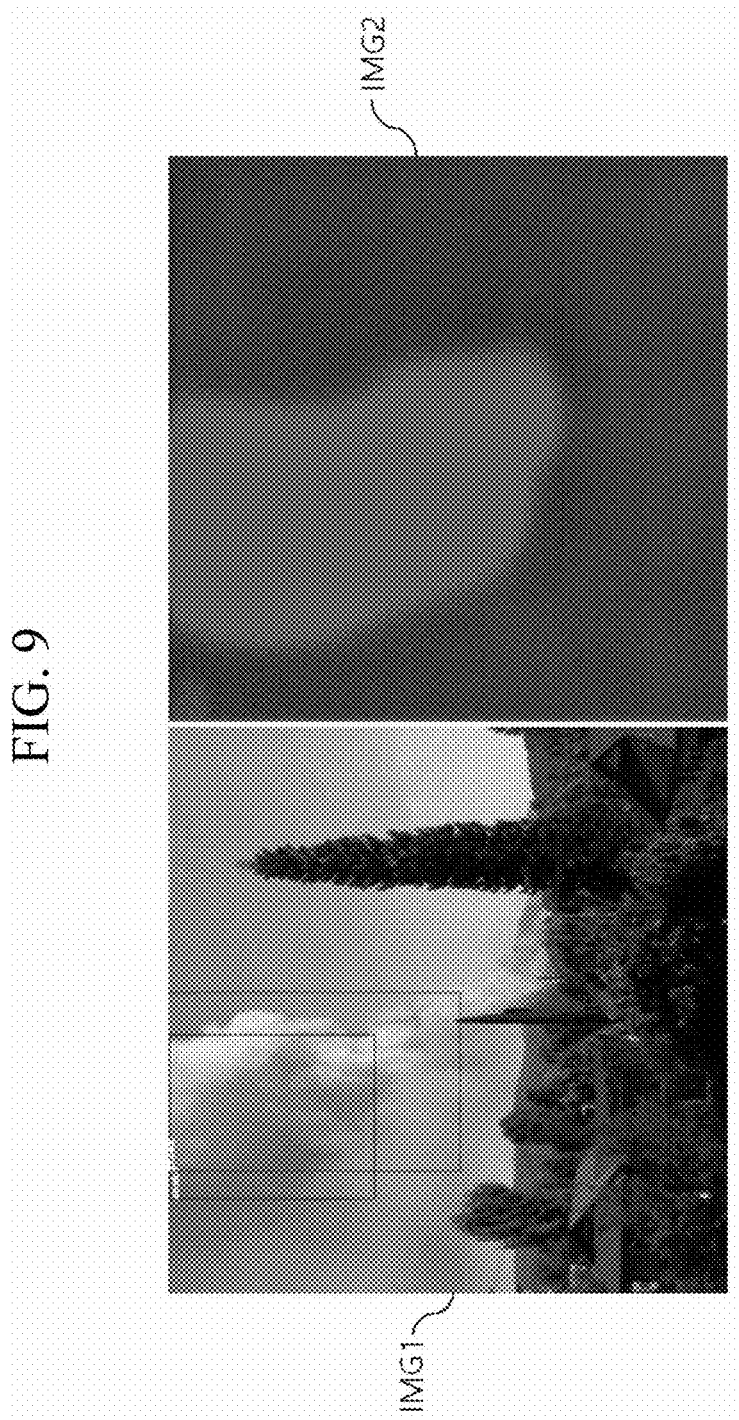

FIG. 8 and FIG. 9 show an operational example of an image feature detecting module according to an embodiment of the present invention.

Referring to FIG. 8, the image IMG1 shows recognizing the image feature on the flame corresponding to the fire element, and displaying the predicted second candidate area (i.e., a flame area) with a box. The image IMG2 displays the soft mask of the predicted flame area.

Referring to FIG. 9, the image IMG1 shows recognizing the image feature of the smoke corresponding to the fire element and displaying the predicted second candidate area (i.e., smoke area) with a box. The image IMG2 shows displaying the soft mask of the predicted smoke area.

Figure 10:
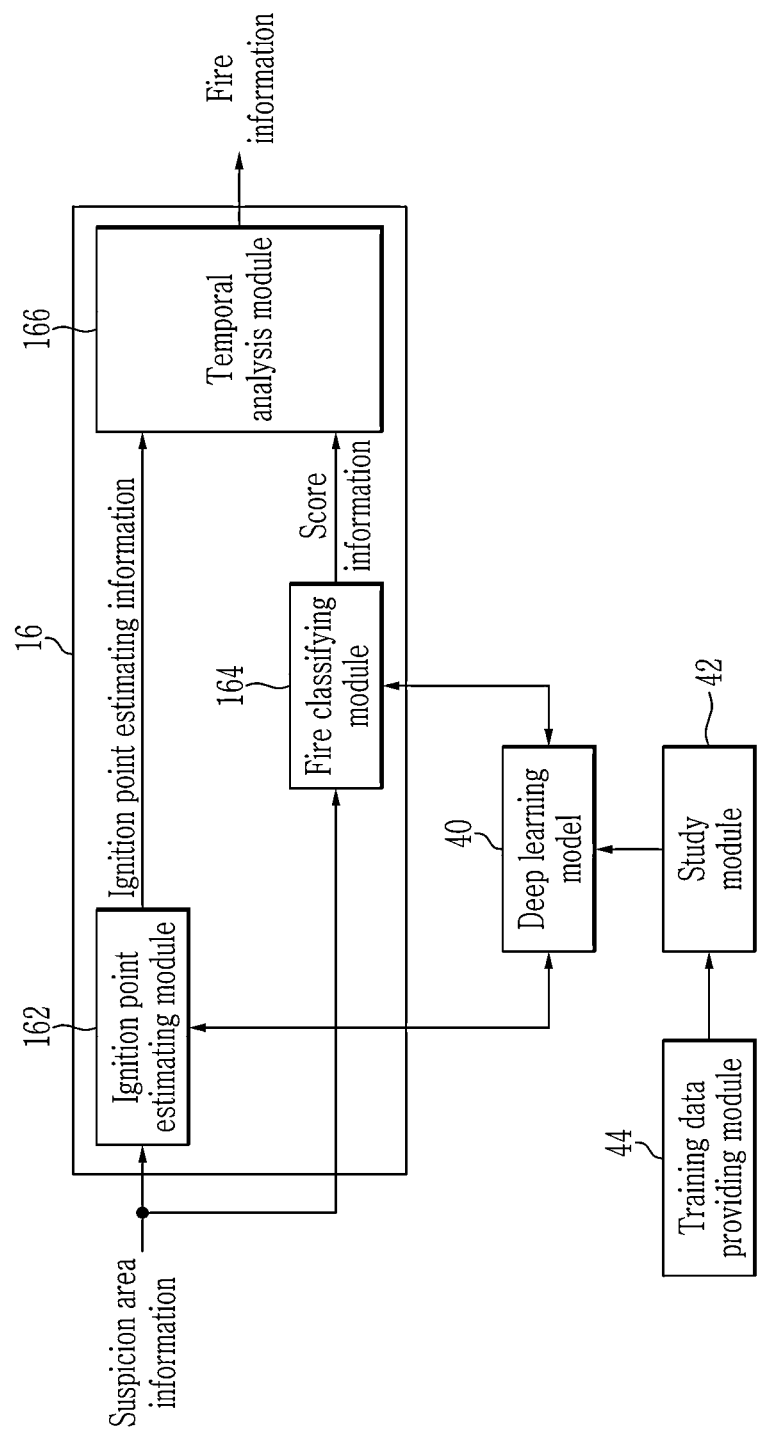
FIG. 10 shows a block diagram of a fire analyzing module according to an embodiment of the present invention.

FIG. 10 shows a block diagram of a fire analyzing module according to an embodiment of the present invention.

Referring to FIG. 10, the fire analyzing module 16 may include an ignition point estimating module 162, a fire classifying module 164, and a temporal analysis module 166.

The ignition point estimating module 162 may estimate the position of the ignition point in the suspicion area. In detail, the ignition point estimating module 162 may estimate the position of the ignition point by using the deep learning model studied with synthetic training data that are a synthesis of the fire element and backgrounds by a computer graphics process.

The ignition point corresponds to the unique feature of the fire phenomenon, and the accuracy of detecting generation of fire may be further increased by using the optical flow data and the ignition point data. In other words, when the deep learning model 40 is made to study by using the optical flow training data and the ignition point training data, the determination on whether a fire is generated by the deep learning model 40 may become more accurate.

However, generating the ignition point training data in the actual environment costs much and its quality is unsatisfactory, so the ignition point training data may be generated with the synthetic training data that are a synthesis of the fire element and backgrounds by the computer graphics process.

For example, the training data providing module 44 may provide the synthetic training data that are a synthesis of the fire element and backgrounds by a computer graphics process, that is, the data on the position of the ignition point to the study module 42, and the study module 42 may make the deep learning model 40 study by using the training data provided by the training data providing module 44. The ignition point estimating module 162 may input information on the suspicion area to the deep learning model 40, and the deep learning model 40 may estimate the position of the ignition point in the suspicion area.

The fire classifying module 164 may calculate classifying scores obtained by predicting a generation of fire in the suspicion area. In detail, the fire classifying module 164 may score whether a fire is generated in the suspicion area by using the deep learning classifying model, or may calculate classifying scores having scored the probability in which the fire element of the suspicion area is classified into flame or smoke.

The fire classifying module 164 may classify (or distinguish) whether a fire is generated in the suspicion area, and may calculate the classifying scores corresponding to the scores corresponding to the classifying probability for respective classifications by using a general deep learning-based classifier. The fire classifying module 164 may classify (or distinguish) flame and smoke in the suspicion area by using a deep learning-based classifier.

The temporal analysis module 166 may determine whether a fire is generated based on the position of the ignition point and the classifying score. In detail, the input image may include a plurality of frames, and the temporal classifying module 166 may determine whether a fire is generated by considering temporal coherence of a plurality of frames.

For example, the temporal analysis module 166 may calculate a mixed score $S_{(T)}$ of the input image for one frame T based on the position of the ignition point, the optical flow, and the classifying score according to Equation 1.

$$S_{(T)} = W_1 * \text{Conf(Ignition Point)} + W_2 * \text{Overlap Ratio (Optical Flow)} + W_3 * \text{Class Score} \quad \text{[Equation 1]}$$

Here, Ignition Point is a position of the ignition point, Optical Flow is an optical flow, Class Score is a classifying score, Conf( ) is reliability of the detected ignition point, Overlap Ratio( ) is a ratio of the detected optical flow area to the ignition point area, and $W_1$, $W_2$, and $W_3$ are weight values. The reliability of the detected ignition point may signify the probability in which the ignition point detected based on the feature studied with deep learning corresponds to the actual ignition point.

The temporal analysis module 166 may calculate the final score $F_{(n)}$ of N-numbered (here, N is a positive integer) frames based on the mixed scores calculated for the respective frames of the input image including the suspicion area according to Equation 2.

$$F_{(n)} = W_1 * S_1 + W_2 * S_2 + \ldots W_n * S_{(n)} \quad \text{[Equation 2]}$$

Here, n is a positive integer, and a summation of the weight values is $\Sigma W_n = 1.0$.

The temporal analysis module 166 may determine that no generation of fire is detected when a value of the final score $F_{(n)}$ is less than a predetermined threshold value, and it may determine that a generation of fire is detected when the value of the final score $F_{(n)}$ is equal to or greater than a predetermined threshold value.

Together with the temporal analysis module 166, the above-described fire classifying module 164 may be extensively realized to consider the temporal coherence and determine whether a fire is generated in the current frame from the data of the previous N-numbered frames. For example, the fire classifying module 164 may be realized to consider temporal coherence by adding a recurrent neural network (RNN), a long short-term memory (LSTM), and a gated recurrent unit (GRU) in the convolutional neural network (CNN)-based per-frame classifier.

According to the present embodiment, the accuracy of determining whether a fire is generated may be increased by using the ignition point estimating module 162 as a main engine and the fire classifying module 164 as an auxiliary engine to the suspicion area. The accuracy of determining whether a fire is generated may be further increased by determining whether a fire is generated by considering the temporal coherence of a plurality of frames.

Figure 11:
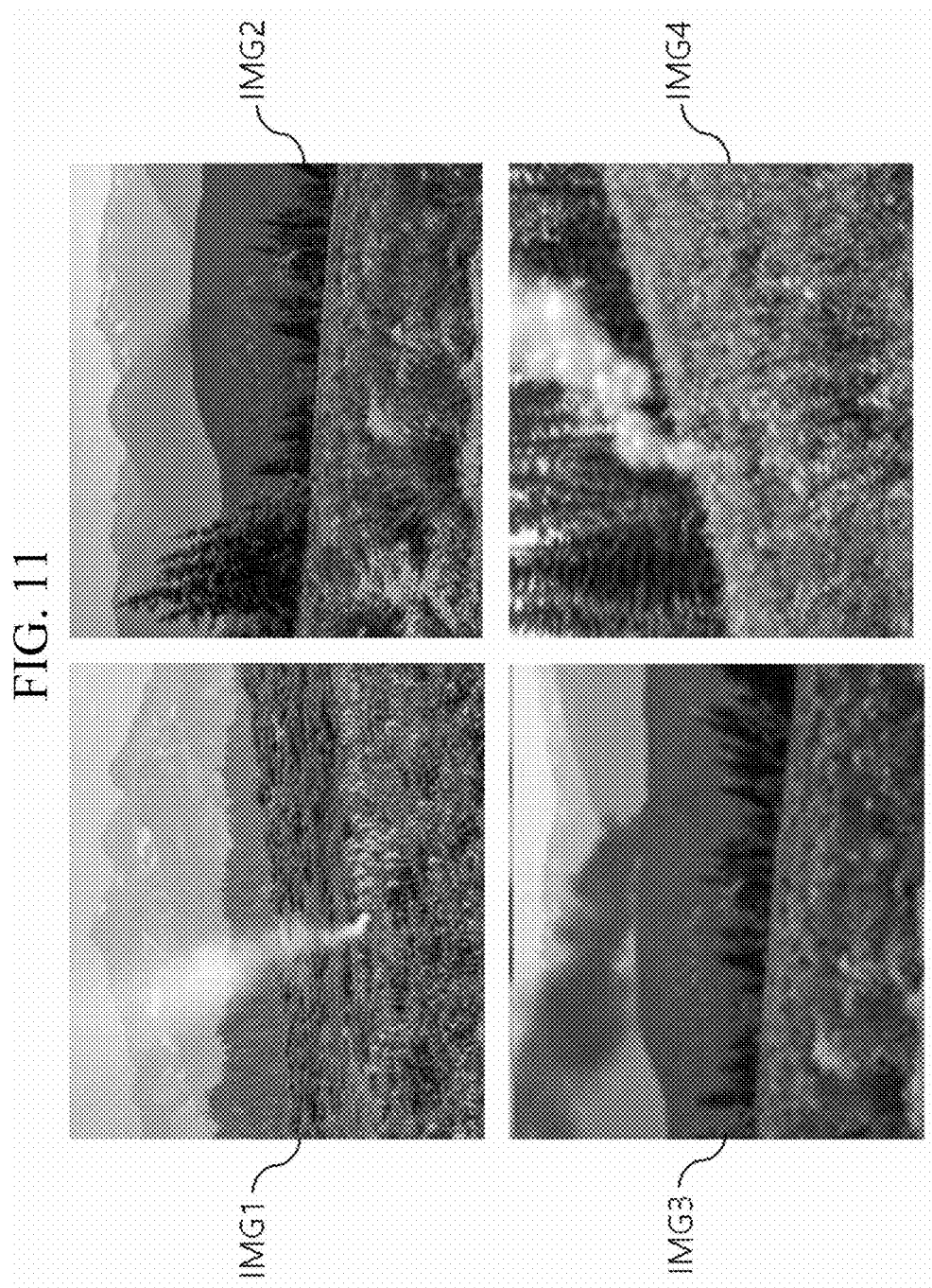
FIG. 11 and FIG. 12 show an operational example of an ignition point estimating module according to an embodiment of the present invention.
Figure 12:
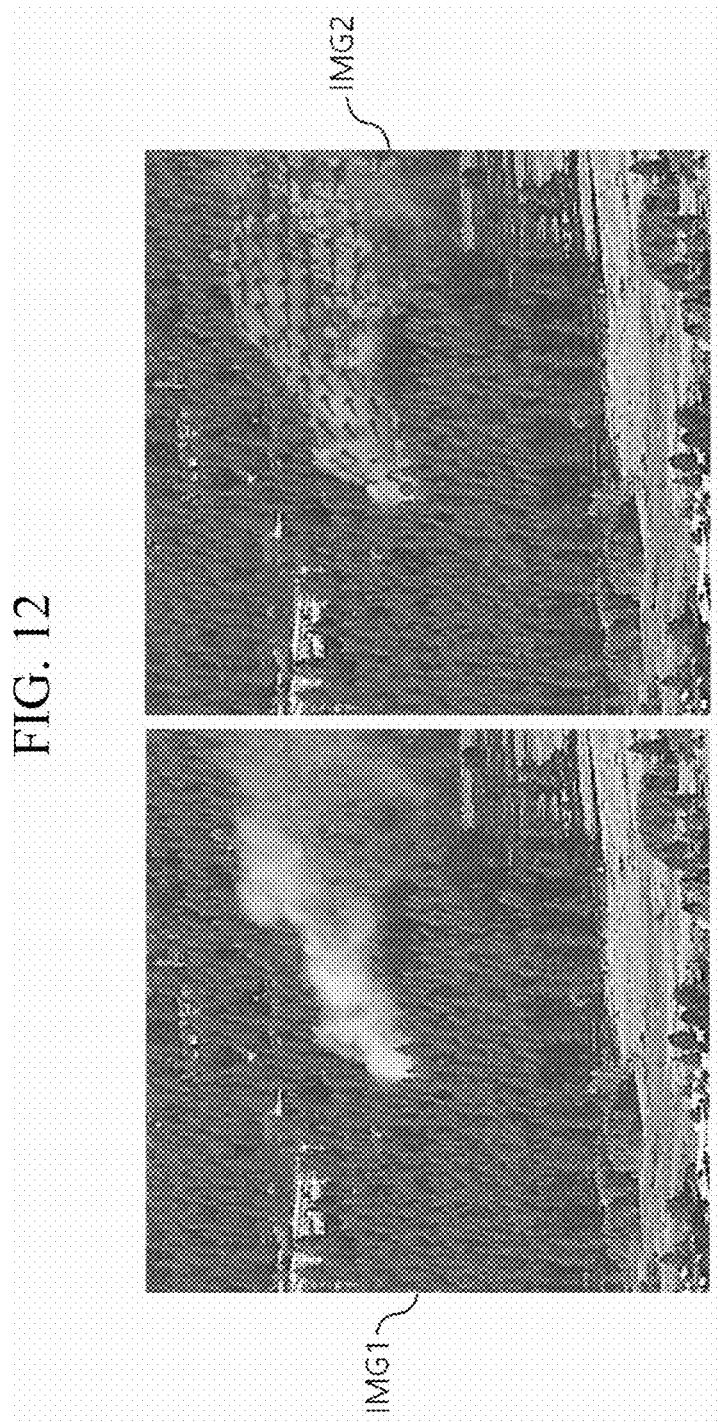

FIG. 11 and FIG. 12 show an operational example of an ignition point estimating module according to an embodiment of the present invention.

Referring to FIG. 11, the images (IMG1 to IMG 4) exemplify synthetic training data that are a synthesis of the fire element and backgrounds by a computer graphics process, that is, the data on the position of the ignition point. Regarding the training of the deep learning model used to the ignition point estimating module 162, generating the ignition point training data in the actual environment costs much and its quality is unsatisfactory, so the ignition point training data may be generated with the synthetic training data that are a synthesis of the fire element and backgrounds by the computer graphics process.

Referring to FIG. 12, the image IMG1 corresponds to an original version of the input image, and the image IMG2 shows the ignition point and the optical flow predicted through the ignition point estimating module 162 and the optical flow detecting module 142 as dots and arrows.

Figure 13:
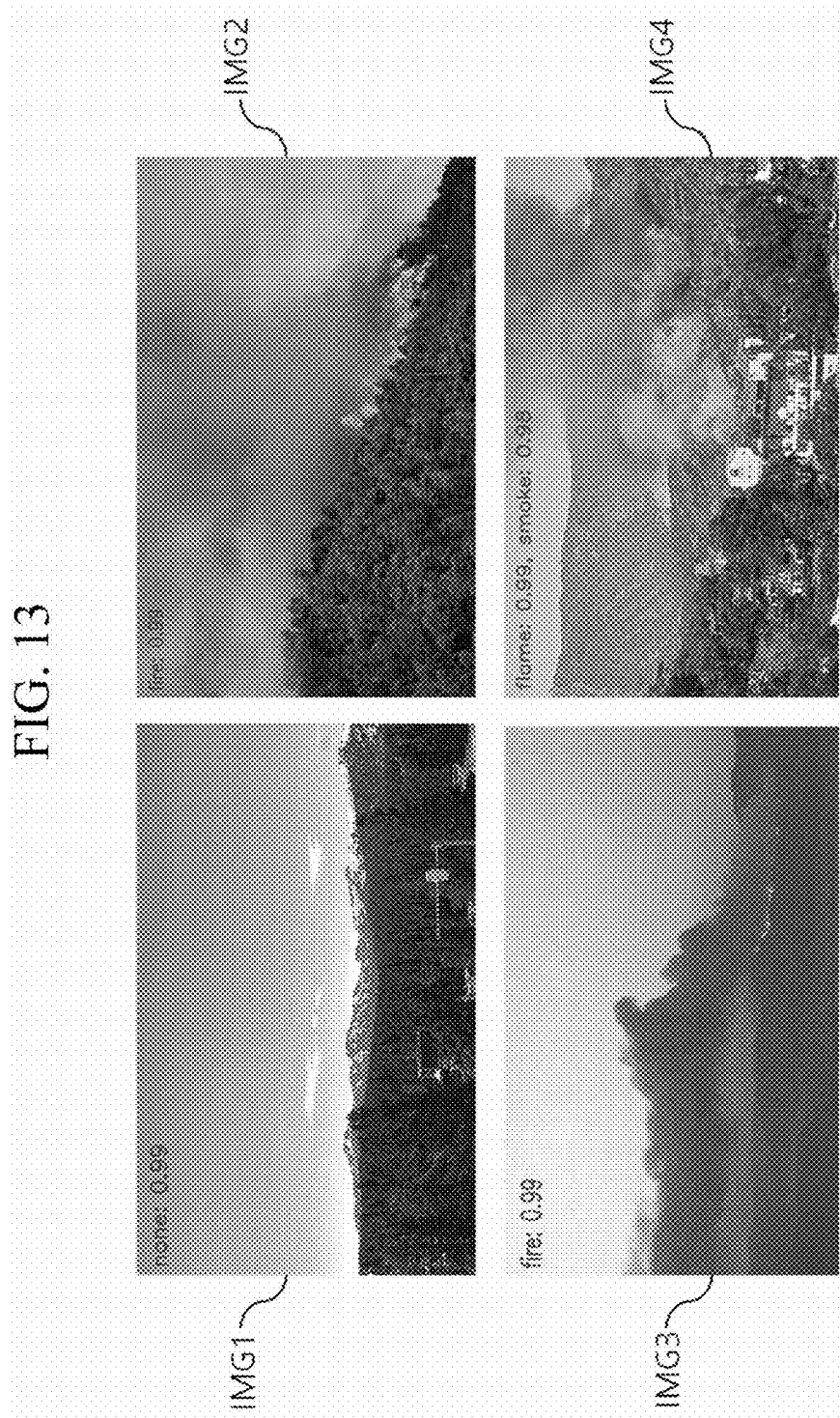
FIG. 13 shows an operational example of a fire classifying module according to an embodiment of the present invention.

FIG. 13 shows an operational example of a fire classifying module according to an embodiment of the present invention.

Referring to FIG. 13, the image IMG1 shows an example of predicting whether a fire is generated by using the deep learning classifying model through the fire classifying module 164, and it represents a case in which the probability (or the classifying score) in which the fire is not generated is 0.99.

The images IMG2 and IMG3 show an example of predicting whether a fire is generated by using the deep learning classifying model through the fire classifying module 164, and they represent a case in which the probability (or the classifying score) in which the fire is generated is 0.99.

The image IMG4 shows an example of classifying and predicting flame and smoke by using the deep learning classifying model through the fire classifying module 164, and it corresponds to a case in which the probability (or the classifying score) corresponding to flame is 0.99, and the probability (or the classifying score) corresponding to smoke is 0.98.

Figure 14:
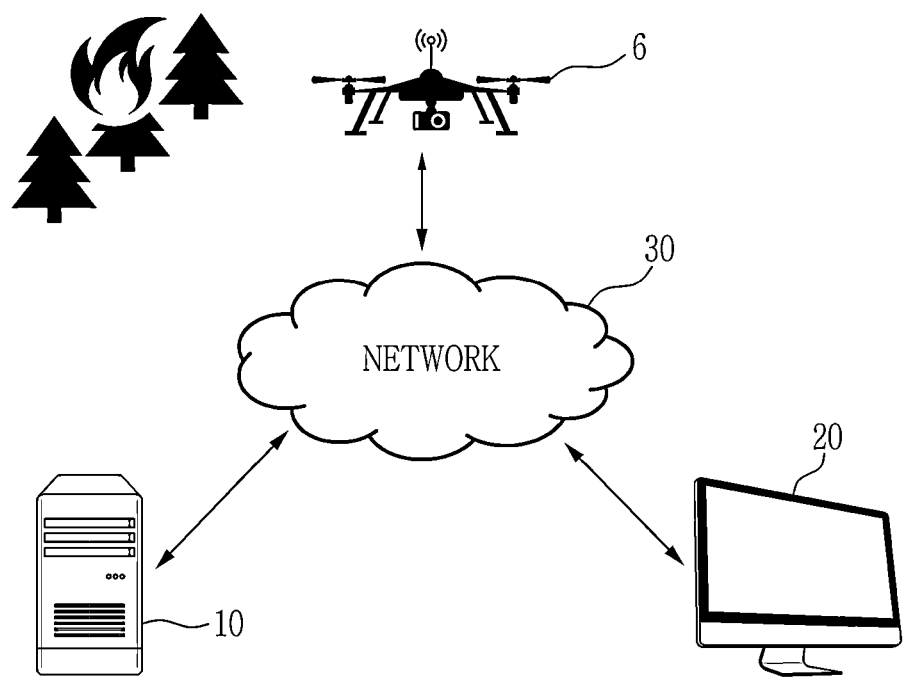
FIG. 14 shows a schematic view of a fire detecting and monitoring system according to an embodiment of the present invention.

FIG. 14 shows a schematic view of a fire detecting and monitoring system according to an embodiment of the present invention.

Referring to FIG. 14, the fire detecting and monitoring system 3 may include an unmanned air vehicle 6, a fire detecting system 10, and a monitoring device 20. The unmanned air vehicle 6, the fire detecting system 10, and the monitoring device 20 may transmit and receive data to/from each other through the network 30.

The unmanned air vehicle 6 is a pilotless aircraft and it is also referred to as an unmanned aircraft, an unmanned vehicle, an unmanned plane, or a drone. The unmanned air vehicle 6 indicates a flight vehicle for autonomously flying in a semi-auto-piloted form on a remote piloted or preprogrammed path, or mounting an artificial intelligence and performing tasks according to self-determination on the environment.

The unmanned air vehicle 6 may fly in specific points and their nearby areas and may include a camera for photographing the places where fires may break out. That is, the unmanned air vehicle 6 may photograph the predesignated places by using the installed camera, and may provide the photographed images to the fire detecting system 10. In some embodiments of the present invention, the camera 5 may provide the photographed image with a single modality to the fire detecting system 10. Here, the photographed image with a single modality may be, for example, a color (RGB) image and a near infrared (NIR) image, and a range of the present invention is not limited thereto.

Particularly, the unmanned air vehicle 6 may include a hardwired device for correcting the shaking at the time of photographing, for example, a gimbal. Hence, the image photographed by the unmanned air vehicle 6 may be provided to the fire detecting system 10 without shaking correction described with reference to FIG. 2. The fire detecting system 10 generates fire information on the predesignated place from the photographed image provided by the unmanned air vehicle 6, and provides the fire information to the monitoring device 20.

Descriptions on the fire detecting system 10, the monitoring device 20, and the network 30 may refer to what are described with reference to FIG. 1, and no repeated descriptions will be provided.

Figure 15:
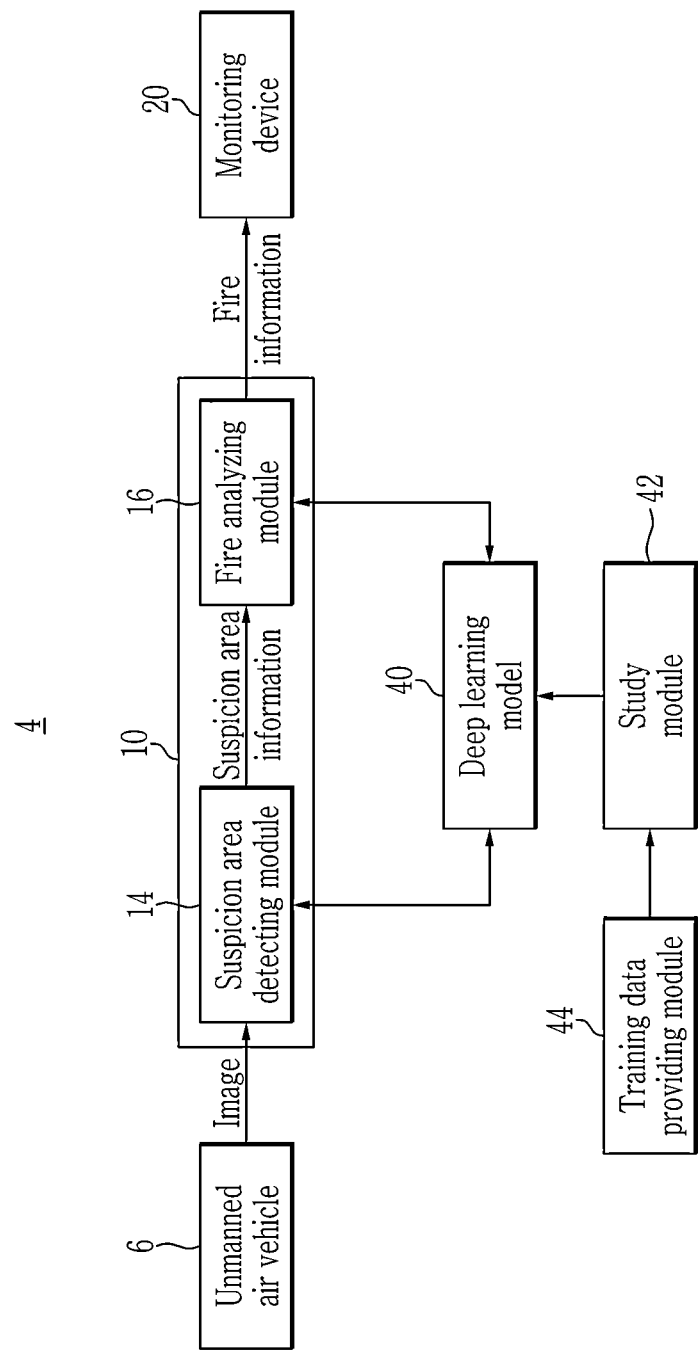
FIG. 15 shows a block diagram of a fire detecting and monitoring system according to an embodiment of the present invention.

FIG. 15 shows a block diagram of a fire detecting and monitoring system according to an embodiment of the present invention.

Referring to FIG. 15, the fire detecting and monitoring system 4 may include an unmanned air vehicle 6, a fire detecting system 10, a monitoring device 20, a deep learning model 40, a study module 42, and a training data providing module 44. Descriptions on the unmanned air vehicle 6 may refer to what are described with reference to FIG. 14, descriptions on the remaining portion may refer to what are described with reference to FIG. 2, and no repeated descriptions will be provided.

The unmanned air vehicle 6 may provide the image photographed by the unmanned air vehicle 6 to the suspicion area detecting module 14, suspicion area detecting module 14, and the suspicious area detection module 14 may determine fire from the image provided from the unmanned air vehicle 6. The fire analyzing module 16 may determine whether a fire has broken out by analyzing the suspicion area determined by the suspicion area detecting module 14.

In the case of photographing by use of the unmanned air vehicle 6, the shaking correction described with reference to FIG. 2 may be additionally performed depending in the detailed realization objects. That is, the fire detecting system 10 may be realized to include a stabilizing module 12, and the stabilizing module 12 may be realized to correct the shaking of the photographed image provided by the unmanned air vehicle 6 and provide the shaking corrected image to the suspicion area detecting module 14.

Figure 16:
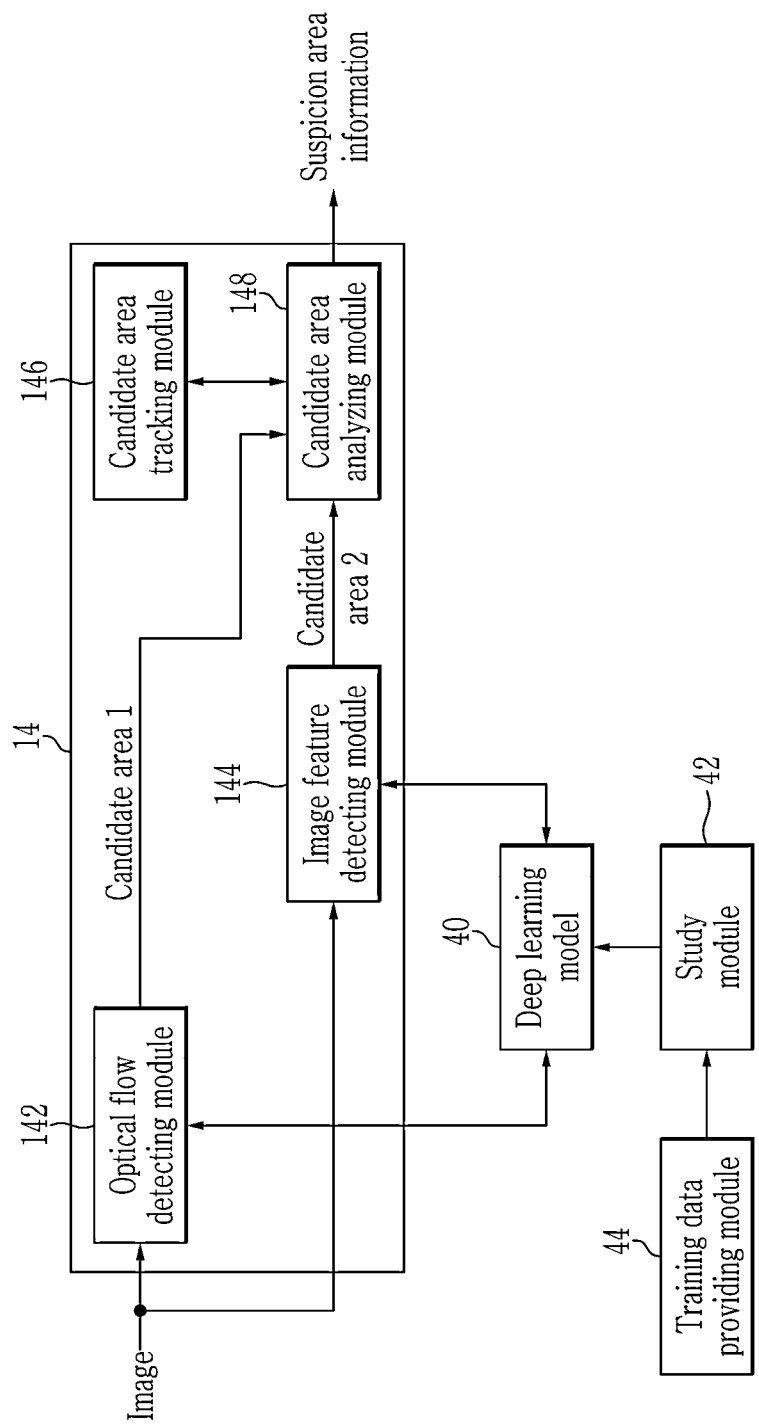
FIG. 16 shows a block diagram of a suspicion area detecting module according to an embodiment of the present invention.

FIG. 16 shows a block diagram of a suspicion area detecting module according to an embodiment of the present invention.

Referring to FIG. 16, the suspicion area detecting module 14 may include an optical flow detecting module 142, an image feature detecting module 144, a candidate area tracking module 146, and a candidate area analyzing module 148.

In the present embodiment, the optical flow detecting module 142 and the image feature detecting module 144 may receive the image photographed by the unmanned air vehicle 6 and may detect the first candidate area and the second candidate area.

However, the range of the present invention is not limited thereto, in the case of photographing by use of the unmanned air vehicle 6, and when the shaking correction described with reference to FIG. 2 is additionally performed according to the detailed realization objects, the optical flow detecting module 142 may be realized to receive the second image to which the shaking correction is additionally performed and the image feature detecting module 144 may be realized to receive the first image to which the shaking correction is not performed, the optical flow detecting module 142 may be realized to receive the first image and the image feature detecting module 144 may be realized to receive the second image, and the optical flow detecting module 142 and the image feature detecting module 144 may be realized to receive the second image.

Depending on detailed realization objects, one of the optical flow detecting module 142 and the image feature detecting module 144 may be omitted. That is, in an embodiment described with reference to FIG. 16, the optical flow detecting module 142 may be omitted and the image feature detecting module 144 may receive the first image or the second image to detect the candidate area and provide the same to the candidate area analyzing module 148, and on the contrary, the image feature detecting module 144 may be omitted, and the optical flow detecting module 142 may receive the first image or the second image to detect the candidate area and provide the same to the candidate area analyzing module 148.

According to an embodiment of the present invention, when the external forces such as rain and wind are applied to the camera installed outside, the fire detecting system corrects the shaking of the photographed image, thereby increasing the fire detecting accuracy. The fire detection may be performed with high accuracy by analyzing the photographed image with a single modality such as the color (RGB) image or the near infrared (NIR) image According to an embodiment of the present invention, the fire detecting system 10 may increase the accuracy of detecting the candidate areas with high probabilities of generation of fire by using the deep learning scheme, and estimating the motion of the fire element such as flame and smoke and simultaneously recognizing the image feature (e.g., color, texture, form, brightness, etc.) of the fire element.

According to an embodiment of the present invention, the accuracy of determining whether a fire is generated may be increased by using the ignition point estimating module 162 as a main engine and the fire classifying module 164 as an auxiliary engine to the suspicion area. The accuracy of determining whether a fire is generated may be further increased by determining whether a fire is generated by considering the temporal coherence of a plurality of frames.

While this invention has been described in connection with what is presently considered to be practical examples, it is to be understood that the invention is not limited to the disclosed embodiments, but, on the contrary, is intended to cover various modifications and equivalent arrangements included within the spirit and scope of the appended claims.

The invention claimed is:

1. A fire detecting system comprising:
an optical flow detecting module for estimating a motion of a fire element from an input image, and determining a first candidate area in the input image;
an image feature detecting module for recognizing an image feature of the fire element from the input image, and determining a second candidate area in the input image;
a candidate area analyzing module for determining a suspicion area in which generation of fire is suspected in the input image based on the first candidate area and the second candidate area;
an ignition point estimating module for estimating a position of an ignition point in the suspicion area;
a fire classifying module for calculating classifying scores obtained by predicting whether a fire is generated in the suspicion area;
a temporal analysis module for determining whether a fire is generated based on the position of the ignition point and the classifying scores; and
a stabilizing module for providing a shaking corrected image obtained by correcting shaking of the input image to the optical flow detecting module and the image feature detecting module,
wherein
the candidate area analyzing module outputs suspicion area information including at least one of an optical flow vector and an optical flow size showing an optical flow approximating a position of the suspicion area, a size of the suspicion area, a motion of the fire element in the input image, a soft mask indicating flame predicted from the input image, and a soft mask indicating predicted smoke in the input image, and
wherein
the stabilizing module includes
a motion vector extracting module for extracting a motion vector from the input image, and
a temporal smoothing module for performing a temporal smoothing process on the input image by using the motion vector.

2. The fire detecting system of claim 1, wherein
the input image includes a plurality of frames, and
the optical flow detecting module determines the first candidate area by using a deep learning model studied with optical flow training data among a plurality of frames generated by a computer graphic process.

3. The fire detecting system of claim 1, wherein
the image feature detecting module determines the second candidate area by using a deep learning model studied with generated fire training data corresponding to the fire element.

4. The fire detecting system of claim 1, further comprising
a candidate area tracking module for tracking the first candidate area and the second candidate area and providing tracking results to the candidate area analyzing module.

5. The fire detecting system of claim 1, wherein
the ignition point estimating module estimates the position of the ignition point by using a deep learning model studied with synthetic training data that are a synthesis of the fire element and backgrounds by a computer graphic process.

6. The fire detecting system of claim 1, wherein
the fire classifying module scores whether a fire is generated in the suspicion area by using the deep learning classifying model, or calculates the classifying scores having scored the probability in which the fire element of the suspicion area is classified into flame or smoke.

7. The fire detecting system of claim 1, wherein
the input image includes a plurality of frames, and
the temporal classifying module determines whether the fire is generated by considering temporal coherence on the frames.

* * * * *